May 9, 1950 V. ISACCO 2,506,873
ROTATING WING PARACHUTE
Filed Feb. 23, 1946 3 Sheets-Sheet 1
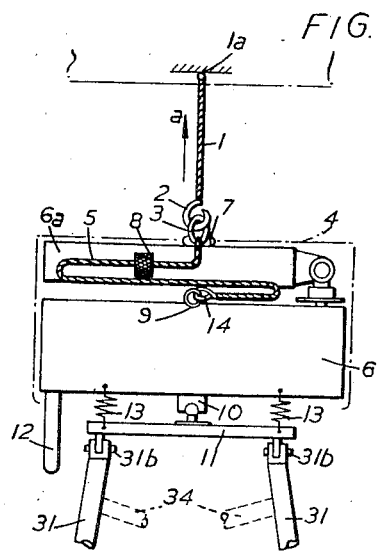
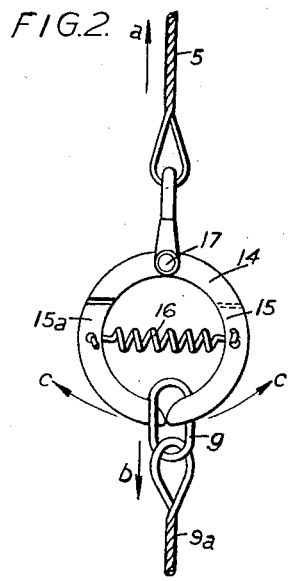
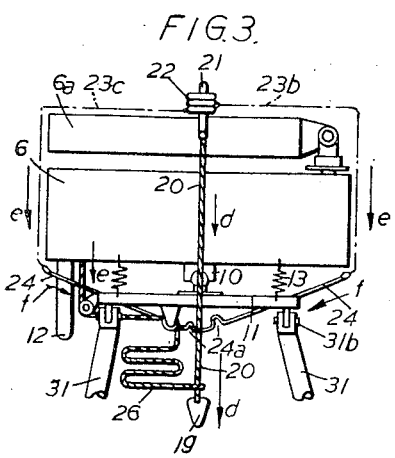
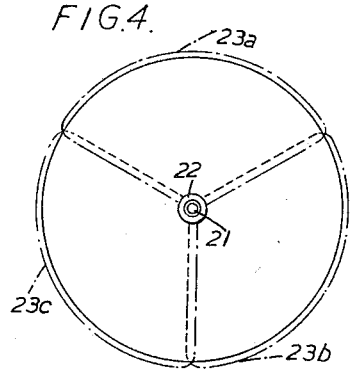
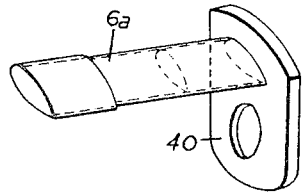
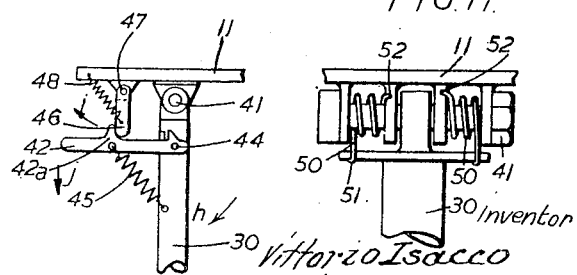
Inventor
Vittorio Isacco
by
Attorney

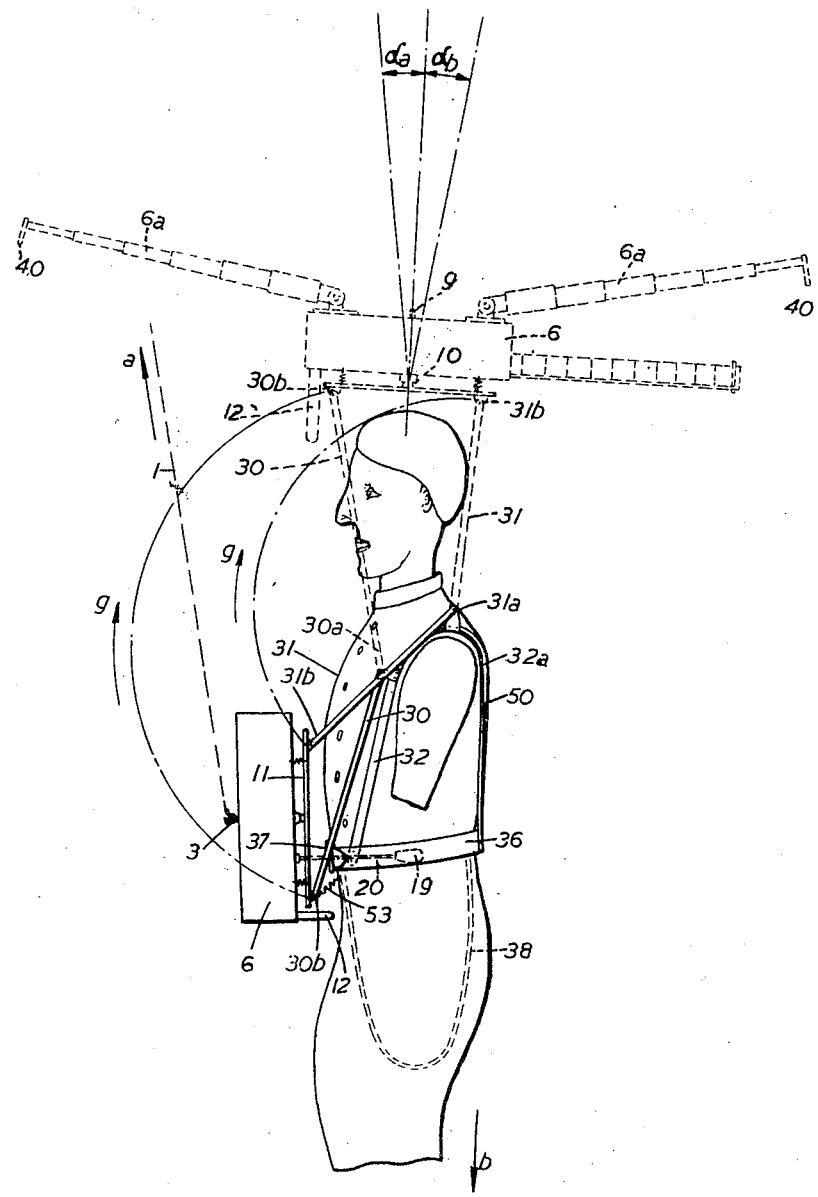

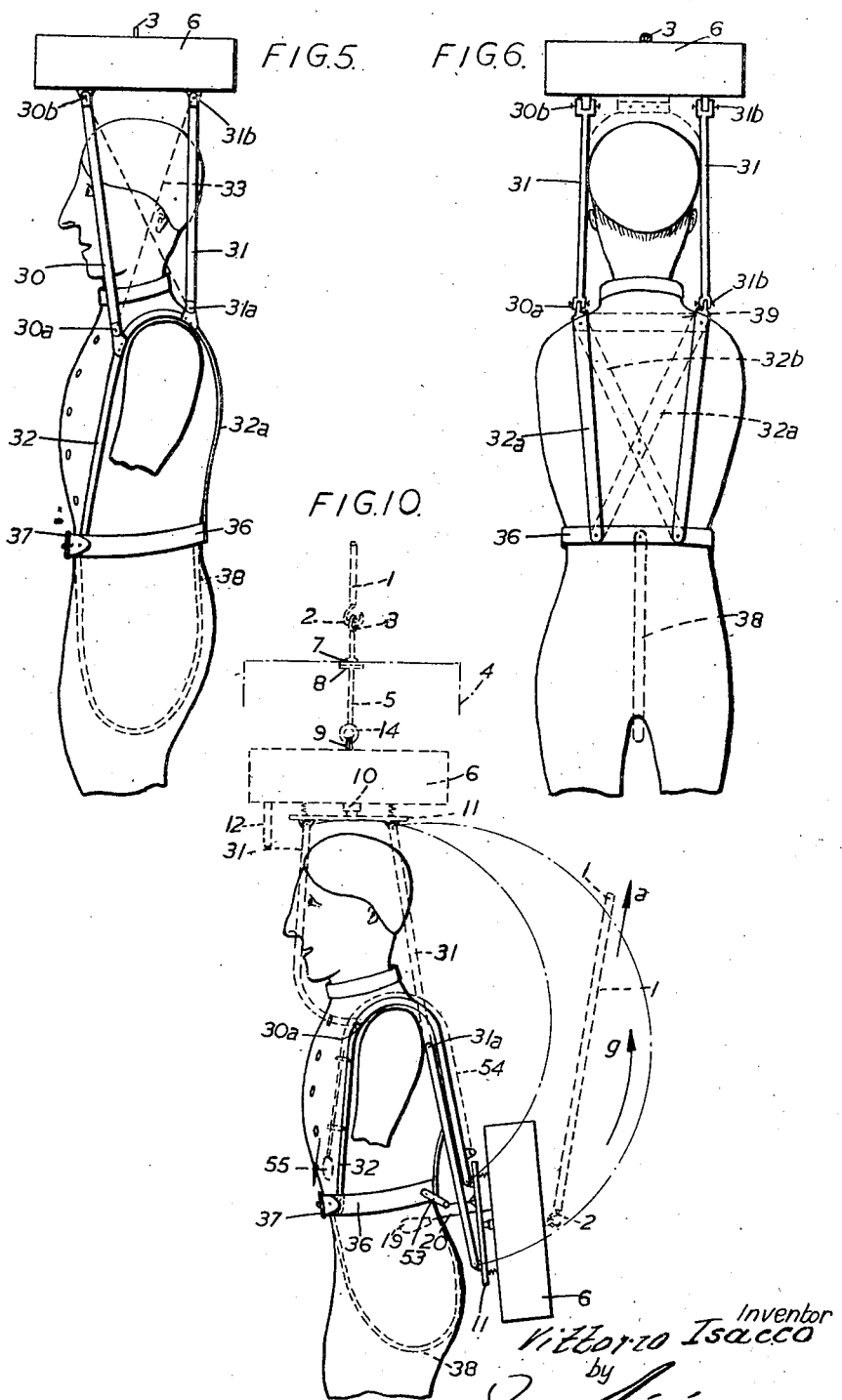

Patented May 9, 1950

2,506,873

UNITED STATES PATENT OFFICE 2,506,873

ROTATING WING PARACHUTE

Vittorio Isacco, London, England

Application February 23, 1946, Serial No. 649,674
In Great Britain and Northern Ireland
February 23, 1945

25 Claims. (Cl. 244—138)

The present invention relates to parachute harness and more particularly to a harness that is capable of use with a rotating wing parachute such as that described in U. S. Patent 2,457,376 of December 28, 1948.

The principal object of the present invention is to provide a parachute harness attachable to the wearer's body by means of two different systems of harness, one rigid and bearing on or near the pilot's shoulders and the other flexible and fitted around and over or, if desired, under the body of the wearer.

The operation of the parachute may be automatic, which means that the parachute is to be opened by virtue of the fall by means of a wire or the like, attached to the plane on its upper end, and joined to the said parachute-ring at its lower end, this ring is fitted just over the general cover of the apparatus.

The operation may also be controlled by the wearer himself any time after he jumps from the plane, in which case said ring is fitted below the bottom of the apparatus and is attached to a handle or the like, which the wearer can pull at the required moment.

When landing in bad conditions, in order to avoid damage to the telescopic blades, a shock absorber fitted to the tips of the blades is provided and constitutes a further improvement on the said copending application.

The accompanying drawings show the improvements forming the subject of the present application, in which Fig. 1 is an elevation of a parachute showing the mounting on the harness;

Fig. 2 is a detail view showing the automatic release of the parachute wire where attached to the plane;

Figs. 3 and 4 show the arrangement for the controlled opening of the parachute;

Figs. 5 and 6 are side and back views of the wearer's harness for the case when the parachute is before and after operation, fixed over the wearer's head;

Fig. 7 is a view showing the harness with the parachute in front of the wearer;

Fig. 8 shows in perspective the shock absorber fitted on the blade tips;

Fig. 9 is a detail view showing a method of locking the rigid elements constituting the hinging harness automatically when the parachute is over the wearer's head;

Fig. 10 is a view showing the harness with the parachute on the back of the wearer;

Fig. 11 is a detail showing part of means to assist the movement of the parachute from the out-of-use position to the in-use position.

Improvements relating to the release of the parachute will first be described; in Fig. 1, the release wire or the like 1 is fixed at 1a to any part of the plane, and at its lower end by means of a hook 2 to a ring 3 which just projects from the general cover 4 (shown dotted) of the parachute body 6.

A loosely coiled wire 5 located between the blades 6a on the parachute body 6 runs inside the cover, from the ring 3 to a ring 9.

A hole 7 located at about the centre of the cover 4 leaves free passage to the wire 5, but not to a bead or the like 8 on the wire, which bead or the like when it comes against the periphery of said hole 7 during the initial part of the fall of the parachute pulls the general cover 4 upwards relatively to the parachute.

The ring 9 is located in the centre of and at the top of the body 6 of the parachute, by means of an automatic release device as described hereafter. The pull of the ring, by virtue of the wearer's fall, will release the stop holding the driving pulley, which then will start the blades into rotation as described briefly above, and in detail in the said copending specification.

As also described in detail in said copending specification the body 6 of the parachute is mounted on the top plate 11 of the wearer's harness, by means of a spherical joint 10. The control lever 12 allows the wearer to control the direction of the descent by inclining the axis of the parachute towards the direction he desires to travel. Springs 13 are located between the bottom of the body 6 of the parachute and the top plate 11 of the harness, in order to limit and restrict such inclination, and ensure vertical descent when the lever 12 is not operated. The top part of the harness is constituted by the plate 11 and the tubes or rigid elements 31 as described hereinafter.

In Figs. 1 and 2 the internal starting wire 5 is attached to a ring or the like 14 which is constituted of two articulated parts 15 and 15a pivoting on axis 17. These parts are maintained tight one against the other by means of the spring 16, fixed at each of its ends to parts 15 and 15a.

The ring 9 to which is connected the wire 9a joined to the release stop of the internal driving pulley, passes inside the ring 14 constituted by the parts 15 and 15a whose ends are conveniently shaped to enable the ring 9 to engage between the said ends.

When the parachute is used the pull on wire 5 transmitted from release wire 1 in the direction of arrow a will produce a corresponding pull on ring 9 according to arrow b. When this pull overcomes the effort necessary to separate the parts 15 and 15a one from the other, the ring 9 will be released, and the parachute will freely continue its fall.

The spring 16 is calculated so that the effort necessary to release the ring 9 from the ring 14 is greater than the effort necessary to release the stop of the internal driving pulley, the said stop being connected to the ring 9. In other words, the efforts on the wires by virtue of the fall, will in the first place release the internal driving pulley starting the blades into rotation, and then soon after release the ring 9 and hence the parachute, from the ring 14 and from the plane.

In the case where the opening is pilot-controlled (Figs. 3 and 4), the operation is similar, but the opening wires or the like are at the bottom of the apparatus. In the drawings they are shown externally of the cover, but in practice they will be located inside the cover.

The wearer pulls handle 19 in the direction of arrow d. This handle is secured to a wire 20 which passes through the interior of the central shaft of the apparatus. Wire 20 is connected to a pin 21 passing through and holding in place the rings 22 which form the ends of the various parts 23a, 23b and 23c of the general cover of the apparatus.

To the wire 20 are attached wires 24 connected to the lower ends of the parts 23a, 23b, 23c; a loop 24a is provided on each wire 24. Also to the wire 20 is attached a wire 26 having a longer loop which at its upper end is attached to the stop releasing the interior driving pulley.

Consequently, the pull on handle 19 will in the first place, pull down the pin 21 and release the rings 22. A further pull, will pull down according to arrows e the parts 23a, 23b, 23c constituting a general cover around the body of the apparatus with the result that this cover is removed out of the paths of the blades. When the blades are free from the cover, a still further pull will act on the release stop, and consequently the blades will be set into rotation.

The wearer's harness is constituted in two parts, the first part is rigid, and may in some cases be of an articulated construction. It may be located over the wearer's head, or capable of movement to this position and it bears over the wearer's shoulders. The second part is flexible and is constituted by the usual strips of thick canvas or the like, and is fitted conveniently around the wearer's body as well as over his shoulders.

In Fig. 5 which shows the parachute intended to be fixed even at rest, over the wearer's head, the rigid harness is constituted by two sets of tubes or elements, one set 30 near the front of the wearer and the second set 31 near the back. Each set of tubes or elements can be joined together and constitute a single frame. The tubes 30 are attached at 30a to the flexible harness over the wearer's shoulder and at 30b to the body of the parachute, which in this case is shown without the joint articulation mounting, and therefore without the control devices during descent. The tubes 31 are similarly attached at 31a and 31b.

Wires such as 33 (indicated in dotted lines in the drawing) can be fitted in order to join one set of tubes to the other for strength and rigidity.

The flexible harness, is constituted by the usual straps 32 and 32a running over the shoulders from the front to the back of the wearer and attached to belt 36. This belt is provided with the usual quick release device 37 allowing for the wearer to get rid of the parachute immediately after landing. The usual strip 38 running also from the front to the back of the belt and passing between the legs of the wearer can be fitted if desired.

As seen from Fig. 6 the straps 32a can be crossed as is indicated by dotted lines 32b. A supplementary connecting strap such as 39 (indicated in dotted lines) can be provided for the purpose of preventing the straps 32, 32a from slipping from the shoulders.

When the parachute 6 is mounted normally in front of the wearer (Fig. 7), the rigid harness is exactly constituted as described above, but the tubes 30 and 31 are respectively articulated at both ends 30a, and 30b, and 31a and 31b. In the drawing, the parachute is shown with the articulated mounting as in Figs. 1 to 3 and the control or steering lever 12 depending from the body 6 of the parachute.

When the wearer falls, the wire 1 which is attached at its upper end to the plane, will pull the parachute upwards substantially according to arrow a. The parachute 6 will then hinge on the articulated joints 30a and 31a, fixed over the flexible harness which joints constitute the fixed points for the hinging movement according to the arrows g. Once the parachute is above the head of the wearer, the tubes 30 and 31 are automatically locked in this position by means of any kind of locking devices of which an example is described hereafter.

The effort necessary to achieve this movement is small compared with the pull required to separate the wire 1 from the ring 9 as described for Fig. 2.

The axis of the parachute can be fixed either vertically, or inclined forwards at an angle a, or backwards at an angle b according to requirements of the flight.

Once the parachute is over the head, then the cover is released first and taken-up and the blades are started into rotation, as previously described. In Fig. 7, the parachute and the blades already extended are represented in dotted lines, as well as the position of the hinging tubes of the rigid harness.

While landing, the wearer might be turned over, and the blades will hit the ground. A shock absorber 40 is fitted at the tip of each blade therefore on the exterior of the last element of the blades 6a (Fig. 8).

The automatic locking device for the hinging tubes 30a, 31 is shown by way of example in Fig. 9. In this figure, the tube such as 30 is articulated at 41 to the upper plate 11 of the harness. During the hinging movement this tube 30 rotates around axis 41 with respect to the plate 11 according to the arrow h. At the end of its movement a lever 42 attached to the tube 30 will push another lever 46 jointed to plate 11 at 47. A compression spring 48 fixed at one end to the plate 11 and at the other end to the lever 46 will replace this lever in its original position, once the finger 42a of lever 42 has passed. The method of support of lever 46 is such that it cannot rotate in the opposite direction as indicated by the arrow i. When the landing is effected, and the wearer wants to lower the parachute he presses the end of lever 42 downwards in the direction of arrow j, the lever 42 being articulated on 44 to the tube 30. A compression spring 45 allows for this disengagement after which lever 42 takes its original position again.

In the arrangement of Fig. 10 the parachute is placed behind the wearer (on his back) and can be hinged and locked upwards as indicated in dotted lines, the apparatus is shown at the instant when the general cover 4 is raised away from the body 6 and the wire 5 is in tension just at the moment when the ring 9 will act on the stop which releases the driving internal pulley and which will then start the blades into rotation. As previously described, when the blades have been started, the ring 14 will be automatically released from the ring 9.

The operation for the controlled opening of the parachute at the will of the wearer is indicated in heavy dotted lines both in Figs. 7 and 10.

A wire as 1 (Fig. 1) fixed to the plane is not used so that the hinging of the apparatus from the front or the back of the wearer to above his head will have to be achieved by means other than the pull due to the fall.

Many devices can be fitted but as an example, Fig. 11 shows one system of realisation. Tube 30 of the harness as an example, is articulated as indicated in Fig. 9 to the upper plate 11 at axle 41. Around this axle is fitted a spring or two springs 50 of which one end is fixed to the tube at 51 and the other end to the upper plate at 52. It is easy to understand that if the tube 30 is rotated in relation to the plate 11 the springs 50 will be put into tension and will tend to bring the tube 30 back to its original position.

Therefore when the parachute is at rest against the wearer according to Figs. 7 and 10, the springs 50 are tensioned but they cannot actuate the parachute 6 because the latter is attached to the wearer's body by means of an easy release device 53. When the wearer acts on this release device the springs 50 will bring the corresponding tubes to which they are fitted, to their original position, which would be in this case, the position in which the parachute is over the wearer's head. Then in that position it is automatically locked as described for Fig. 9. In this latter case this automatic locking device of the tubes can eventually be suppressed as the springs 50 will keep the parachute sufficiently in position over the head.

Fig. 10 shows in heavy dotted lines, an auxiliary wire 54 fixed at any suitable point to the upper plate or to the tube of the harness. The other end is attached to a handle 55 guided by the straps 32 so that the wearer, by pulling also on this handle, can (if necessary) help the hinging movement of the apparatus until it comes over his head.

When the parachute is locked over the head, to effect the opening the wearer will have only to pull on handle 19 as explained for Fig. 3. In the drawings Fig. 7 and Fig. 10 only the wire 20 is indicated in dotted lines, the other wires 24 and 26 being inside the bottom of the cover 4.

It is evident that the invention is not limited to the devices described hereabove, and that many other systems can be utilised, which do not modify the principle of the invention namely;

With the automatic opening, the general cover can also be made in various parts as explained for the controlled opening. In this case the intermediate wire 5 is suppressed, the wire 1 attached to the plane, releasing in the first place the parts of the cover which liberate immediately the blades, and then operate the release system of the driving pulley.

Instead of the shock absorber fitted at the tip, the blade elements or at least the outside ones can be constituted of a plastic material sufficiently rigid for the stresses encountered but capable of deformation without breaking under shock.

The rigid harness can be of any other suitable form, in their constitution and in their shape.

The flexible harness can be of various systems of straps above or under the main belt.

I claim:

1. A rotating wing parachute comprising a plurality of telescopic blades, a support for said blades, pivotal mountings on said support for said blades, means to impart an initial rotation to said support, and means to support the parachute on the pilot and which includes two separate systems of harness of which one is rigid and supports the parachute adjacent the wearer's shoulders and the other is flexible and fitted around and over the body of the wearer.

2. A rotating wing parachute comprising a plurality of telescopic blades, a support for said blades, pivotal mountings on said support for said blades, means to impart an initial rotation to said support, a rigid harness supporting the parachute at or near the wearer's shoulders and an associated flexible harness fitted around and over the body of the wearer and also extending under the body of the wearer.

3. A rotating wing parachute comprising a plurality of telescopic blades, a support for said blades, pivotal mountings on said support for said blades, means to impart an initial rotation to said support, a rigid harness designed to support and maintain the parachute before and after operation over the head of the wearer and a flexible harness fitted around and over the body of the wear and connected to the rigid harness.

4. A rotating wing parachute comprising a plurality of telescopic blades, a support for said blades, pivotal mountings on said support for said blades, means to impart an initial rotation to said support, a rigid harness adapted to support the parachute before operation in front of the wearer, a flexible harness, a pivoted joint between the rigid and the flexible harness and means to turn the parachute to a position over the wearer's head before operation.

5. A rotating wing parachute comprising a plurality of telescopic blades, a support for said blades, pivotal mountings on said support for said blades, means to impart an initial rotation to said support, a rigid harness adapted to support the parachute before operation to the rear of the wearer, a flexible harness, and means to turn the parachute to a position over the wearer's head before operation.

6. In combination, a parachute, a flexible harness to fit on the body of a wearer, and a rigid harness connected to said parachute adjacent the wearer's shoulders and movably connected to said flexible harness to support said parachute when in inoperative position.

7. A parachute harness comprising a flexible harness to fit on the body of a wearer, and a rigid harness connected to said flexible harness and for supporting a parachute in operative position above the wearer's head.

8. A parachute harness as defined in claim 7 wherein the rigid harness is rigidly connected to the flexible harness in an upright position for permanently supporting a parachute above the wearer's head.

9. A parachute harness comprising a flexible harness to fit on the body of a wearer, and a rigid harness for supporting a parachute and movably connected to said flexible harness to support a parachute in inoperative position adjacent the body of a wearer and movable to an upright position extending above the wearer's head in operative position.

10. A parachute harness as defined in claim 9 wherein the rigid harness supports the parachute in inoperative position in back of the wearer's body.

11. A parachute harness as defined in claim 9 wherein the rigid harness supports the parachute in inoperative position in front of the wearer's body.

12. A parachute harness as defined in claim 9 wherein the rigid harness is connected to the flexible harness adjacent the wearer's shoulders.

13. A parachute harness as defined in claim 9 wherein the rigid harness is pivotally connected to said flexible harness at the shoulder portions thereof.

14. A parachute harness comprising a flexible harness to fit on the body of a wearer, a rigid harness for supporting a parachute and being pivotally connected to said flexible harness to support a parachute in inoperative position adjacent the body of a wearer and movable to an upright position extending above the wearer's head in operative position, and means for moving said rigid harness from inoperative to operative position.

15. A parachute harness as defined in claim 14 wherein said moving means is manually operated.

16. A parachute harness as defined in claim 14 wherein said moving means is automatically operative.

17. A parachute harness as defined in claim 14 wherein said moving means comprises an automatically releasable connection between said rigid harness and the aircraft occupied by the wearer.

18. A parachute harness as defined in claim 14 wherein said moving means comprises springs.

19. A parachute harness as defined in claim 14 wherein said moving means comprises springs coiled about pivots for said rigid harness.

20. A parachute harness as defined in claim 14 wherein said moving means comprises springs between said rigid harness and said wearer.

21. A parachute harness comprising a flexible harness to fit on the body of a wearer, a rigid harness for supporting a parachute and being pivotally connected to said flexible harness to support a parachute in inoperative position adjacent the body of the wearer and movable to an upright position extending above the wearer's head in operative position, and means for locking said rigid harness in operative position.

22. A parachute harness comprising a flexible harness to fit on the body of a wearer, a rigid harness for supporting a parachute and being pivotally connected to said flexible harness to support a parachute in inoperative position adjacent the body of the wearer and movable to an upright position extending above the wearer's head in operative position, and means for locking said rigid harness in inoperative position.

23. A parachute harness comprising a flexible harness to fit on the body of a wearer, a rigid harness for supporting a parachute and being pivotally connected to said flexible harness to support a parachute in inoperative position adjacent the body of the wearer and movable to an upright position extending above the wearer's head in operative position, means for locking said rigid harness in inoperative position and means for automatically moving said rigid harness to operative position when said locking means is released.

24. A parachute harness comprising a flexible harness to fit on and over the shoulders of the body of a wearer, rigid tubular braces pivotally connected at one end to and on either side of the shoulder fitting portions of said flexible harness, and a parachute support pivoted to the other end of said tubular braces, whereby said braces and support may be folded adjacent the wearer's body in inoperative position or swung to an upright position with said support above the wearer's head in operative position.

25. In combination, a parachute, a flexible harness to fit on the body of a wearer, a rigid harness connected to said parachute and movably connected to said flexible harness to support said parachute when in inoperative position adjacent the wearer's body and movable to an operative position above the wearer's head, and a wire attached at one end to said parachute and at the other end to the aircraft of which the wearer is an occupant, whereby to pull said rigid harness to operative position and open said parachute.

VITTORIO ISACCO.

REFERENCES CITED

The following references are of record in the file of this patent:

UNITED STATES PATENTS

| Number | Name | Date |
|---|---|---|
| 1,165,891 | Martin | Dec. 28, 1915 |
| 1,855,084 | Alvistur | Apr. 19, 1932 |

FOREIGN PATENTS

| Number | Country | Date |
|---|---|---|
| 800,733 | France | May 11, 1936 |
| 814,599 | France | Mar. 22, 1937 |